United States Patent [19]
De Angeli

[11] Patent Number: 5,129,699
[45] Date of Patent: Jul. 14, 1992

[54] AIRFOIL ROOF FOR VEHICLES

[76] Inventor: Anthony J. De Angeli, 6129 Beverly Hills, Coopersburg, Pa. 18036

[21] Appl. No.: 747,628

[22] Filed: Aug. 20, 1991

[51] Int. Cl.$^5$ ............................................. B62D 35/00
[52] U.S. Cl. ................................................. 296/180.1
[58] Field of Search ................ 296/180.1, 180.2, 180.3

[56] References Cited

U.S. PATENT DOCUMENTS

| | | | |
|---|---|---|---|
| 3,328,074 | 6/1967 | Van Rossen | 296/180.1 |
| 3,910,623 | 10/1975 | McKeen | 296/180.1 |
| 4,502,724 | 3/1985 | Grenadier | 296/180.1 |

FOREIGN PATENT DOCUMENTS

| | | | |
|---|---|---|---|
| 1281065 | 11/1961 | France | 296/180.1 |

Primary Examiner—Robert R. Song
Attorney, Agent, or Firm—Fleit, Jacobson, Cohn, Price, Holman & Stern

[57] ABSTRACT

An airfoil roof incorporated into or added onto a vehicle roof in the form of a longitudinal tunnel that is open at the front and closed at the rear which enables air to pass into the forward end of the tunnel during forward movement of the vehicle with the closed rearward end of the tunnel catching such air which causes a limited lifting force to be exerted on the vehicle to, in effect, reduce the weight of the vehicle thereby reducing the energy required to propel the vehicle over a road surface thereby resulting in energy conservation by enabling a vehicle to be propelled a greater distance while consuming a given quantity of fuel which results from the decrease in weight and the reduction in rolling resistance and fricitonal resistance between the vehicle tires and road surface.

5 Claims, 1 Drawing Sheet

AIRFOIL ROOF FOR VEHICLES

BACKGROUND OF THE INVENTION

1. Field of the Invention

The present invention generally relates to unique and novel vehicular structures and more specifically an airfoil roof incorporated into or added onto a vehicle roof in the form of a longitudinal tunnel that is open at the front and closed at the rear which enables air to pass into the forward end of the tunnel during forward movement of the vehicle with the closed rearward end of the tunnel catching such air which causes a limited lifting force to be exerted on the vehicle to, in effect, reduce the weight of the vehicle thereby reducing the energy required to propel the vehicle over a road surface thereby resulting in energy conservation by enabling a vehicle to be propelled a greater distance while consuming a given quantity of fuel which results from the decrease in weight and the reduction in rolling resistance and frictional resistance between the vehicle tires and road surface.

2. Description of the Prior Art

In view of the increased cost of fuel for vehicles and the depletion of the sources of such fuel, various efforts have been made to increase fuel efficiency of vehicles. Such efforts include the reduction in size and weight of vehicles and the construction of vehicle bodies to reduce wind resistance. Also, radial tires have been developed and various other improvement have been made in vehicles to enable vehicles to travel a greater distance while consuming a predetermined quantity of fuel. One of the developments in vehicle body structures is the use of spoilers which are usually mounted on the rear deck of a vehicle and, in some instances, the angle of attack of the spoilers can be adjusted to provide positive or negative vertical thrust on the rear traction wheels of a vehicle.

None of the previous developments utilize an air tunnel mounted on or incorporated into the roof of a vehicle in which the tunnel has a closed rear end and extends for a substantial longitudinal distance as compared to the overall length of the vehicle to catch air in the tunnel as the vehicle moves forwardly to exert an upward lifting force on the vehicle to reduce the effective weight of the vehicle and reduce the rolling contact and frictional resistance to rolling movement along a road surface by all of the tires on the vehicle as incorporated into this invention.

SUMMARY OF THE INVENTION

An object of the present invention is to provide an airfoil roof for vehicles in the form of a tunnel which extends substantially throughout the length of the vehicle roof and introduces an upward lifting force on the vehicle to reduce its effective weight thus reducing the force necessary to propel the vehicle over a road surface which results in increased operating efficiency of the vehicle by enabling the vehicle to be propelled a greater distance with a given quantity of fuel.

Another object of the invention is to provide an airfoil roof in accordance with the preceding object in which the tunnel is generally rectangular in transverse cross-sectional configuration with the tunnel extending substantially throughout the length of the vehicle roof and forming, in effect, an upper roof spaced above the existing vehicle roof with the upper roof and closed rear end of the tunnel catching air and being configured to form an airfoil to provide an upward lifting force on the vehicle which will be sufficient to lower the effective weight of the vehicle but will not lift the vehicle completely off of a road surface thereby enabling the vehicle wheels to maintain traction for propulsion and maintain traction for steering control of the vehicle.

A further object of the invention is to provide an airfoil tunnel for a vehicle roof in accordance with the preceding objects which can be incorporated into new vehicle structure or used as a retrofit attachment which is relatively simple in construction and will not add materially to the cost of a vehicle while conserving energy and reducing the operating cost of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
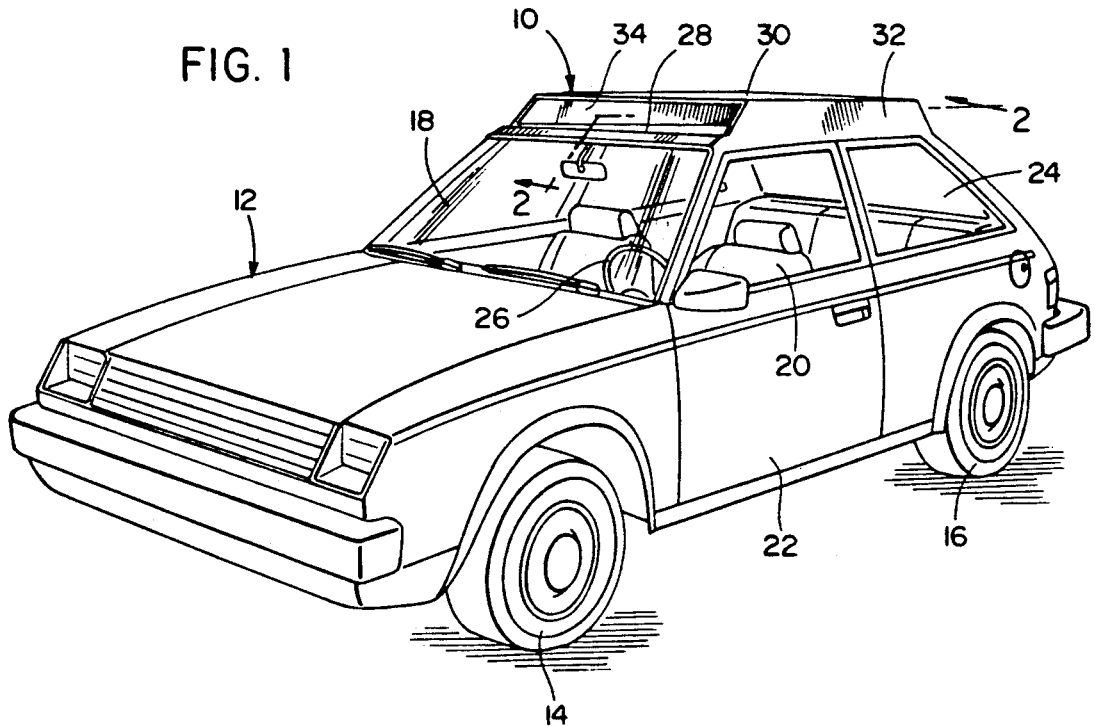
FIG. 1 is a perspective view of a vehicle with the airfoil roof of the present invention incorporated thereon.
Figure 2:
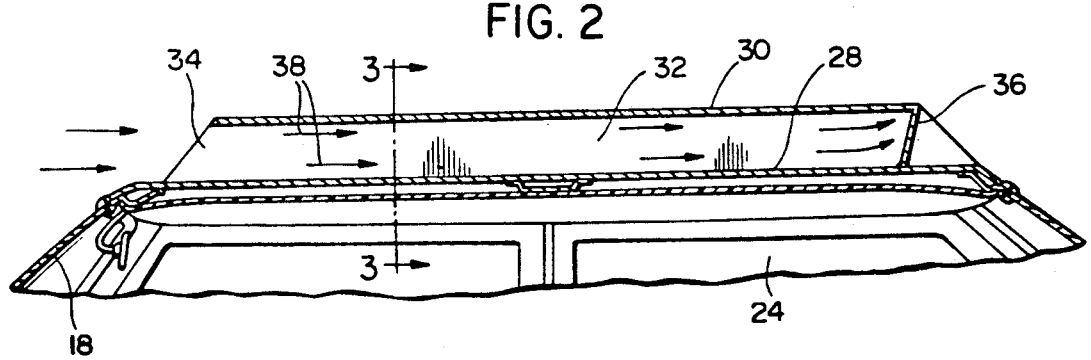
FIG. 2 is a longitudinal sectional view taken substantially upon a plane passing along section line 2—2 on FIG. 1 illustrating the structure of the airfoil roof and direction of movement of air into open front end thereof and being caught in the tunnel by the closed rear end.
Figure 3:
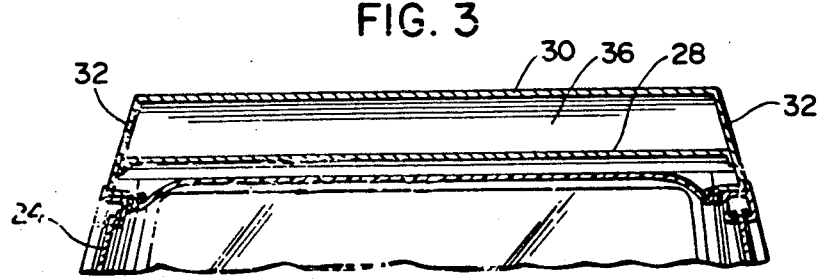
FIG. 3 is a transverse sectional view taken substantially upon a plane passing along section line 3—3 on FIG. 2 illustrating further structural details of the airfoil roof and its association with the vehicle roof.

Referring now specifically to the drawings, the airfoil roof of the present invention is generally designated by reference numeral 10 and, as illustrated in FIG. 1, it is associated with a conventional fuel powered vehicle 12 having front steerable wheels 14 and rear wheels 16 with the vehicle either being a front wheel drive, rear wheel drive or all wheel drive. The vehicle 12 also includes the usual components of a vehicle body including a windshield 18, seats 20, access doors 22, windows 24, a steering wheel 26 and a roof 28 all of which represent conventional vehicular structure.

The airfoil roof 10 of the present invention includes a top panel or upper roof 30 which is generally parallel to the roof 28 with the panel or upper roof 30 extending substantially throughout the length of the vehicle roof 28 thereby forming a continuous tunnel. As illustrated in the drawings, the overall length and width of the panel or upper roof 30 which forms the tunnel when combined with the roof 28 is generally the same rectangular configuration as the roof 28. The side edges of the panel or upper roof 30 are provided with downwardly extending side walls 32 which define the tunnel and which are connected to or integral with the vehicle body structure or roof 28 of the vehicle. The front of the tunnel includes a transversely extending, generally rectangular air inlet 34 defined by the front edge of the upper roof 30, the front edge of each side wall 32 and the front portion of the vehicle roof 28. The rear of the tunnel is closed by a transversely extending imperforate panel 36 rigidly connected with or integral with the upper roof 30, the side walls 32 and the rear portion of vehicle roof 28. The panel 30 or upper roof generally parallels the vehicle roof 28 which usually has some longitudinal and transverse convex curvature. As the air is trapped in the tunnel under a positive pressure, the shape and configuration of the interior and exterior surfaces of the panel or upper roof 30, the side walls 32, the rear panel 36 and the vehicle roof 28 are such that the air imparts a limited upward force or lifting force to the panel or upper roof 30 thus exerting an upward lifting force on the vehicle which reduces the resistance to rolling contact of each tire 14 with a road surface thereby enabling less fuel to be used to propel the vehicle a given distance. In addition, lifting a portion of the weight of the vehicle provides a smoother ride since a portion of the vehicle weight is suspended from the airfoil roof 10 when the vehicle is moving in a forward direction with the forward speed and upward slant of the forward portion of upper roof 30 determining the lifting force or thrust exerted by the airfoil roof 10 as indicated by arrows 38 with the shape and configuration of the panel also determining the lifting force exerted by the panel or upper roof 30.

The airfoil roof may be constructed of sheet metal or reinforced plastic with the strength requirements of the materials being sufficient to withstand the forces encountered during over the road movement of the vehicle. As previously indicated, the airfoil roof may be incorporated into new vehicle structures by forming the tunnel unitarily with the vehicle roof or the tunnel may be attached such as by providing inturned flanges on the lower edges of the side walls 32 which can be secured to the vehicle roof 28. Also, the airfoil roof 10 can be used with various types of vehicles other than the passenger automobile shown in the drawings. The use of this airfoil roof is especially useful during relatively high speed travel which notoriously reduces fuel efficiency of vehicles. The lifting thrust or force exerted by the airfoil roof will greatly increase the fuel efficiency of vehicles by reducing the force required to propel the vehicle but will not lift the vehicle sufficiently to reduce steering and driving traction between the vehicle tires and the road surface. The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An airfoil roof for a vehicle comprising an enlarged panel generally conforming in shape and size to a vehicle roof and extending substantially throughout the length and width thereof and means supporting the panel in vertically spaced relation to a vehicle roof to provide a tunnel, said tunnel including an open forward end and a closed rear end formed by a rear end panel, for entry of air into the open forward end when the vehicle is moving in a forward direction with closed rear end of the tunnel catching the air to produce an upward thrust on the vehicle when the vehicle is moving forwardly.

2. The structure as defined in claim 1 wherein said means supporting the panel above the vehicle roof includes a pair of side panels being continuous with the side edges of the enlarged panel to form a peripherally complete tunnel when combined with a vehicle roof.

3. The structure as defined in claim 1 wherein said open forward end of the tunnel extends throughout the width of the vehicle roof with the tunnel being substantially the same size throughout its length.

4. The structure as defined in claim 2 wherein the enlarged panel, side panels, rear end panel and vehicle roof include surface areas producing vertical lift when air enters into and is caught in the tunnel to reduce the weight of the vehicle and reduce resistance to rolling movement of the tires on a road surface caused by rolling friction while maintaining steering, driving and braking contact of the vehicle tires with the road surface.

5. In combination with a vehicle having a body with a roof and road contacting tires with the weight of the vehicle and the structural characteristics of the tires requiring the burning of fuel to produce power to propel the vehicle, an airfoil roof mounted on said vehicle roof and including an upper roof in generally spaced parallel relation to the vehicle roof and defining a tunnel having an inlet opening at the front and a closure panel at the rear with forward movement of the vehicle causing movement of air into the tunnel with rear closure panel trapping the air in the tunnel, said tunnel being shaped to enable air entering the tunnel to exert an upward lift on the vehicle to reduce the weight of the vehicle where the tires contact the road surface.

* * * * *